INVENTOR.
MARVIN A. FRENKEL
BY Norbert P. Holler
ATTORNEY 3,541,824
MAGNETIC FORMING METHODS AND
APPARATUS
Marvin A. Frenkel, 26323 Hendrie Blvd.,
Huntington Woods, Mich. 48070
Continuation-in-part of application Ser. No. 685,433,
Nov. 24, 1967. This application Aug. 20, 1969,
Ser. No. 851,716
Int. Cl. B21d 26/14
U.S. Cl. 72—56                                10 Claims

ABSTRACT OF THE DISCLOSURE

A method of magnetically forming workpieces to the contours of a die is disclosed. An amorphous mass of metallic particles is juxtaposed to the free surface of the workpiece the other surface of which faces the die. The mass of particles is then subjected to the action of a high intensity magnetic field to force the mass of particles and therewith the workpiece against the die so as to assume a corresponding shape or surface configuration. Upon removal of the magnetic field, the particles can be withdrawn from the workpiece for subsequent reuse.

Figure 1:
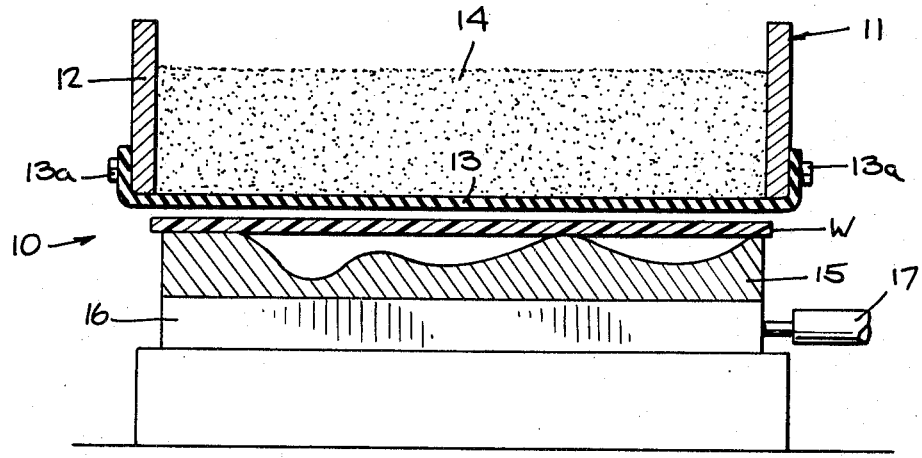

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

---

This application is a continuation-in-part of my prior copending application Ser. No. 685,433 filed Nov. 24, 1967.

This invention relates to magnetic forming methods and apparatus.

Magnetic forming techniques for use in shaping electrically conductive metallic sheet material, both in plane and tubular form, have for some time been the subject of intensive development activities. See, for example, National Aeronautics and Space Administration Technology Utilization Reports, NASA SP–5017 titled "Metal-Forming Techniques" (May 1965) and NASA SP–5034 titled "The Electromagnetic Hammer" (December 1965), and U.S. Pat. No. 2,976,907 issued Mar. 28, 1961 to G. W. Harvey et al. Basically, in such a procedure, electrical energy stored in a bank of capacitors is discharged through a coil with the aid of suitable switching devices to create an extremely high intensity magnetic field which causes eddy currents to be generated in the workpiece and results in a magnetic repulsion pressure of as much as 50,000 p.s.i. being exerted on the workpiece over a very short time interval, ranging generally up to a few microseconds (although greater durations are possible under appropriate conditions).

Inasmuch as this method is not in and of itself adapted to the forming of non-metallic workpieces, which, being electrically non-conductive, could not have the necessary eddy currents and resultant countermagnetic fields generated therein, it has been proposed for this purpose, for example in Brower U.S. Pat. No. 3,279,228 and Inoue U.S. Pat. No. 3,365,522, to interpose a body of conductive metal between the forming coil and the workpiece, so that the required magnetic pressure can be exerted on such body and therethrough on the workpiece to force the latter against the die. This has entailed some drawbacks, however. Thus, in the Brower system, where the metallic body is in the form of a plate or the like, it is necessary to interpose a deformable pressure transmitting medium, such as a block of rubber or paraffin, between the metallic body and the workpiece in order to prevent deformation of the body and preserve it for reuse. In the Inoue system, on the other hand, where the metallic body is in the form of a thin layer deposited directly on the workpiece and deformed therewith, it is unsuited for further use and a separate layer must be provided for each workpiece.

It is an object of the present invention, therefore, to provide novel methods of magnetically forming both metallic and non-metallic workpieces.

It is another object of the present invention to provide novel forms of apparatus for the practice of such methods.

More specifically, it is an object of the present invention to provide magnetic forming methods and apparatus as aforesaid in which the requisite force is developed by the use of a high intensity magnetic field to attract an amorphous, essentially flowable, mass of ferromagnetic particles.

It is deemed understood, by way of definition, that the term "forming" and variants thereof as applied to the present invention covers operations for changing the shape as well as operations for changing the surface characteristics of various types of workpieces including both three-dimensional bodies and sheet materials.

Generally speaking, the objectives of the present invention are attained, in the preferred embodiment thereof, by the use of an amorphous mass of metallic particles of ferromagnetic material. The particles which, in the aggregate, constitute a flowable, non-form-retaining body, may be iron filings, steel shot, or the like. The mass of particles is advantageously distributed over a flexible and elastically extensible diaphragm, of natural or synthetic rubber or like material, which constitutes the bottom of a receptacle for the particles and is disposed in close face to face proximity with one surface of the workpiece, the other surface of the latter being in close proximity to the contoured face of a non-magnetic die which in turn is interposed between the workpiece and a high-strength magnet. Upon application of the necessary high intensity magnetic field to the mass of particles, the latter are forced toward the die to cause the workpiece to conform to the die contours which it then retains by virtue of the fact that its elastic limit is exceeded. When the magnetic field is removed, the particle mass is retracted from the workpiece by means of the diaphragm, leaving the workpiece in its formed condition. The particles may, of course, be adapted to engage the free surface of the workpiece directly, and may be removed therefrom, after completion of the forming operation, by gravity, shaking, brushing, magnetic force or otherwise.

Figure 2:
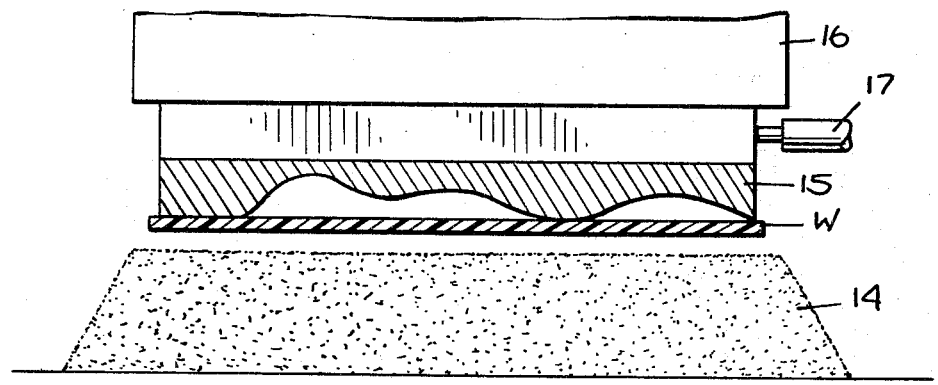
Figure 3:
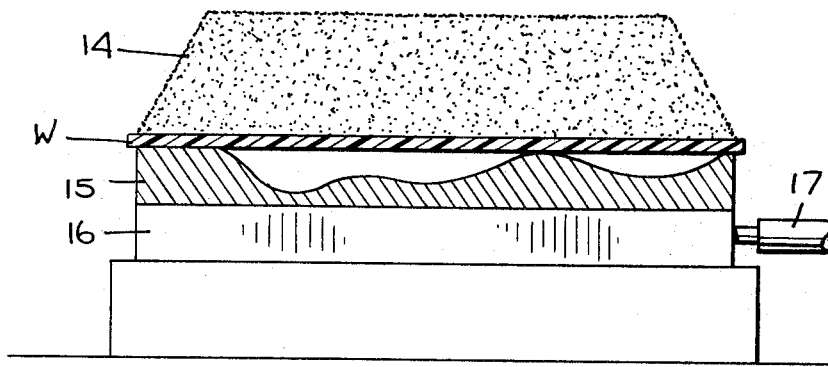

The foregoing and other objects, characteristics and advantage of the present invention will be more fully understood from the following detailed description thereof when read in conjunction with the accompanying drawing, in which:

FIG. 1 is a diagrammatic, partly sectional, elevational view of a novel form of apparatus for the practice of a workpiece forming method according to the present invention; and FIGS. 2 and 3 are similar diagrammatic illustrations of the practice of modified forms of the methods of my invention.

Referring first to FIG. 1, the forming apparatus 10 according to one aspect of my invention basically comprises an enclosure or receptacle 11 having a rigid peripheral wall 12 and a flexible, highly elastic bottom wall 13, preferably composed of a sheet or diaphragm of rubber or like elastomer affixed to the wall 12 as at 13a. Disposed in the receptacle 11 is an amorphous mass 14 of particles of a magnetic material, e.g. iron filings, steel shot or pellets, or the like, and arranged closely thereunder is a non-ferromagnetic, advantageously non-metallic, die 15. The die is shown as resting on an electromagnet 16 capable of providing a high intensity magnetic field. The electromagnet may rest on any suitable support and is adapted to be energized from an appropriate energy source (not shown) via conductor means 17.

In the practice of the method according to this embodiment of my invention, the workpiece W to be formed, shown as a piece of plastic sheet material, is positioned over the contoured face of the die 15. The receptacle 11 with its contained mass of particles of magnetic material is then juxtaposed to the workpiece with the rubber bottom or diaphragm 13 of the receptacle in close proximity to the free surface of the workpiece. When the electromagnet 16 is thereupon energized, a high intensity magnetic field is set up which forces the mass of particles 14 toward the die 15. Those particles which are disposed opposite lower lands or deeper depressions in the die will, of course, have a greater possibility of displacement than particles opposite shallower depressions or higher lands of the die face, and thus the mass of particles will tend to be redistributed accordingly, causing the interposed workpiece W to be deformed in the same sense. The magnetic force will be sufficiently great to cause the material of which the workpiece is made to be stressed beyond its elastic limit and thereby to assume permanently the contours of the die face.

When the magnetic field is removed, the elasticity of the diaphragm 13 enables it to retract and return the mass of particles to their initial amorphous state, leaving the workpiece W in the die from which it may thereafter be stripped in any suitable manner.

It will be understood that in lieu of being placed on the diaphragm 13, the particles 14 may be permitted to contact the workpiece W directly and they may then be removed therefrom after the forming operation is completed in any suitable manner, e.g. by brushing or shaking or with the aid of a relatively mild magnetic force, or even by simply letting the particles drop off by gravity. Thus, as illustrated in FIG. 2, the mass of particles 14 may be located beneath the die 15 and the magnet 16 so as to be drawn up against the workpiece W for the forming operation and to fall away therefrom by gravity as soon as the magnetic force is removed. Alternatively, as illustrated in FIG. 3, the mass of particles 14 may be located directly on the workpiece, from which they can later be removed in any suitable manner as described. If desired, furthermore, a thin, pliable, elastic film or diaphragm of rubber or the like (not shown) can be loosely placed over the free face of the workpiece to aid in the subsequent removal of the particles. In any such an arrangement, of course, means (not shown) ordinarily will be provided to hold the die and the workpiece securely in operative relation to the magnet and the mass of particles.

It will further be understood that although the workpiece W has been illustrated and described as an electrically non-conductive, e.g. plastic, formable sheet, the methods of the present invention may as readily be applied to the forming of sheets made of electrically conductive materials, including non-ferrous metals, and also to the forming of more bulky objects than sheets, e.g. blocks and other three-dimensional structures. In such as case, the "forming" of the workpiece may but need not necessarily involve a shaping operation and may merely produce a change in surface contours, e.g. provide an intaglio or relief surface pattern or design. In the case of sheet materials it may also be necessary, on occasion to provide means for clamping or otherwise fixedly securing the periphery or rim of the workpiece so that it will not follow the body of the latter into the die. If desired, the workpiece, may also be softened somewhat by external heating preparatory to the forming operation.

Although the invention has been described by way of illustration as embodied in a method of forming wherein the amorphous mass of particles is forced against the workpiece by magnetic attraction, it will be apparent that the principles set forth herein can also be applied to methods of forming wherein the particles are forced against the workpiece by magnetic repulsion in a manner analogous to the practices of the aforesaid Harvey et al., Brower and Inoue patents.

Moreover, in any forming operation according to the present invention, whether it be of the nature of drawing a workpiece over a male or into a female die, or of the nature of engraving surface patterns or variations into a workpiece, the amount, i.e. mass and volume, of the particles required will be determined by a variety of factors. Among those are such as the depth and complexity of the pattern to be formed, nature and the strength of the material of which the workpiece is constituted, and the mass, size and surface area of the workpiece to be treated. By the same token, these factors will determine the size of the magnet and the magnetic field strength required.

My invention, therefore, enables both metallic and non-metallic workpieces to be formed, i.e. shaped and/or surface patterned, without requiring the provision of stamping dies and presses and in such a manner as to avoid surface damage to the workpiece. The advantages of this procedure from an economic standpoint will thus be readily apparent.

It will be understood that the foregoing description of preferred aspects of the method and apparatus according to my invention is intended to be illustrative only and that the structural and operational features disclosed herein are susceptible to a number of changes and modifications none of which entails a departure from the spirit and scope of the invention as defined in the hereto appended claims.

Having thus described my invention, what I claim and desire to protect by Letters Patent is:

1. A magnetic forming method, comprising the steps of positioning a workpiece in operative relation to a die, juxtaposing an amorphous mass of metallic particles to the face of said workpiece remote from said die, and applying a high intensity magnetic field to said mass of particles so as to force the same against said workpiece and the latter thereby against said die to cause said workpiece to be stressed sufficiently to permanently assume a configuration corresponding to that of the die.

2. The method of claim 1, wherein said particles are of ferromagnetic material and are forced against said workpiece by magnetic attraction.

3. The method of claim 2, wherein said mass of particles comprises iron filings.

4. The method of claim 2, wherein said mass of particles comprises steel shot.

5. The method of claim 1, wherein said mass of particles is brought into direct contact with said face of said workpiece upon application of said magnetic field.

6. The method of claim 1, wherein said mass of particles is brought into indirect contact with said face of said workpiece through an elastic diaphragm of rubber or like material upon application of said magnetic field.

7. Magnetic forming apparatus, comprising a die the face of which is adapted to be engaged by a workpiece, a source of high intensity magnetic fields juxtaposed to said die, an amorphous mass of metallic particles juxtaposed to the surface of said workpiece remote from the die face, and means connected with said magnetic field source for activating the same so as to develop a high intensity magnetic field capable of forcing said mass of particles against said workpiece and the latter thereby against said die, whereby upon generation of such magnetic field said workpiece is stressed sufficiently to cause it permanently to assume a configuration corresponding to that of said die.

8. Apparatus according to claim 7, said mass of particles comprising iron filings.

9. Apparatus according to claim 7, said mass of particles comprising steel shot.

10. Apparatus according to claim 7, further comprising a receptacle for said mass of particles, the bottom of said receptacle being constituted by an elastic diaphragm of rubber or like material, said diaphragm overlying said surface of said workpiece.

References Cited

UNITED STATES PATENTS

| | | | |
|---|---|---|---|
| 2,976,907 | 3/1961 | Harvey et al. | 72—56 |
| 3,115,857 | 12/1963 | Pfanner | 72—56 |
| 3,126,046 | 3/1964 | Richey | 72—56 |
| 3,149,372 | 9/1964 | Stinger | 72—56 |
| 3,279,228 | 10/1966 | Brower | 72—56 |
| 3,365,522 | 1/1968 | Inoue | 72—56 |
| 3,400,180 | 9/1968 | Buttner et al. | 264—24 |

RICHARD J. HERBST, Primary Examiner

U.S. Cl. X.R.

264—25